United States Patent
Nakagawa (10) Patent No.: US 11,187,951 B2
(45) Date of Patent: Nov. 30, 2021

(54) DISPLAY PANEL

(71) Applicant: Panasonic Liquid Crystal Display Co., Ltd., Himeji (JP)

(72) Inventor: Teruhisa Nakagawa, Hyogo (JP)

(73) Assignee: PANASONIC LIQUID CRYSTAL DISPLAY CO., LTD., Himeji (JP)

(*) Notice: Subject to any disclaimer, the term of this patent is extended or adjusted under 35 U.S.C. 154(b) by 0 days.

(21) Appl. No.: 16/793,453

(22) Filed: Feb. 18, 2020

(65) Prior Publication Data

US 2021/0223651 A1 Jul. 22, 2021

(30) Foreign Application Priority Data

Jan. 20, 2020 (CN) .......................... 202010064909.9

(51) Int. Cl.
 *G02F 1/1362* (2006.01)
(52) U.S. Cl.
 CPC .................. *G02F 1/136286* (2013.01); *G09G 2300/0426* (2013.01)
(58) Field of Classification Search
 CPC ............ G02F 1/136286; H01L 27/124; G09G 2300/0426
 See application file for complete search history.

(56) References Cited

U.S. PATENT DOCUMENTS

| | | | | |
|---|---|---|---|---|
| 2011/0315991 | A1* | 12/2011 | Sugihara | G09G 3/3607 257/59 |
| 2014/0168553 | A1* | 6/2014 | Park | G02F 1/134363 349/43 |
| 2014/0319527 | A1* | 10/2014 | Shin | H01L 27/1259 257/59 |
| 2017/0148404 | A1* | 5/2017 | Xing | G09G 3/3688 |
| 2018/0210303 | A1 | 7/2018 | Wang | |
| 2020/0033684 | A1* | 1/2020 | Tanaka | G02F 1/136286 |

FOREIGN PATENT DOCUMENTS

| | | |
|---|---|---|
| CN | 103869562 B | 10/2016 |
| CN | 106125427 B | 5/2019 |

* cited by examiner

*Primary Examiner* — Jia X Pan
(74) *Attorney, Agent, or Firm* — Westerman, Hattori, Daniels & Adrian, LLP (57) ABSTRACT

A display panel includes multiple pairs of scan lines extending in a first direction, multiple data lines extending in a second direction transverse to the first direction, and multiple connection lines extending in the second direction. For each pair of scan lines, the scan lines are provided with the same electrical signal. The data lines cooperate with the scan lines to define a plurality of pixel regions in such a way that two of the data lines are interposed between two of the pixel regions that are immediately adjacent to each other in the first direction in plan view. Each connection line is electrically connected to a corresponding pair of scan lines.

11 Claims, 9 Drawing Sheets

DISPLAY PANEL

CROSS-REFERENCE TO RELATED APPLICATION

This application is based on and claims priority of Chinese application No. 202010064909.9 filed on Jan. 20, 2020. The entire disclosure of the above-identified application, including the specification, drawings and claims is incorporated herein by reference in its entirety.

FIELD

The disclosure relates to a display panel, and more particularly to a display panel with a reduced frame size in the lateral direction.

BACKGROUND

In a conventional 1G1D (one-gate one-data) structure for a display panel (e.g., a liquid crystal display (LCD) panel, an organic light emitting diode (OLED) panel, etc.), one row of pixels corresponds to a scan line (also referred to as gate line), and one column of pixels corresponds to a data line (also referred to as source line). When a scan line is provided with a turn-on voltage, thin film transistors (TFTs) of the pixels in the corresponding row would be turned on, so data can be written into the row of pixels via the TFTs.

With the advancement of technology, display panels now have increasingly higher display resolutions, which means that there is an increasingly greater number of rows of pixels in a display panel, causing a data-writing period for writing data into one row of pixels to become increasingly shorter. One downside of this trend is that the data-writing period may become too short such that the pixels are unable to be charged to the required data voltages, which causes a serious problem in display quality.

Figure 1:
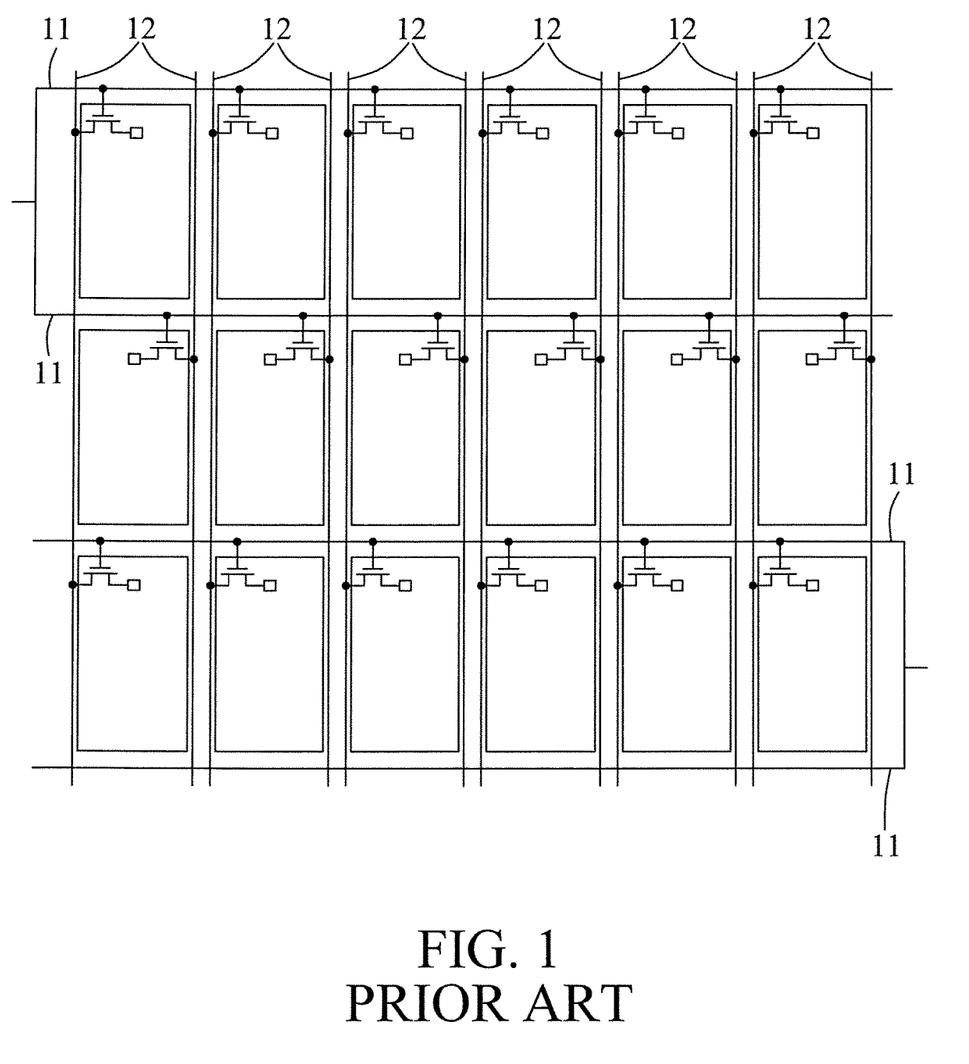
FIG. 1 is schematic diagram illustrating a conventional 1G2D structure for a display panel.

FIG. 1 shows a conventional 1G2D (one-gate two-data) structure that was developed to overcome the abovementioned problem. In the 1G2D structure, each column of pixels corresponds to two data lines 12, so two scan lines 11 can be provided with the turn-on voltage at the same time, thereby charging two rows of pixels simultaneously. As a result, the data-writing period for the 1G2D structure is twice the data-writing period for the 1G1D structure. However, the increased number of data lines reduces an aperture ratio of the pixels.

In addition to the display resolution, the size of a frame border is also of concern in the display panel industry. A display panel usually includes more than a thousand scan lines that extend laterally. In the conventional design, multiple gate driver integrated circuits (ICs) connected to the scan lines are disposed on one or both of the lateral sides of the display panel. The gate driver ICs and the connections between the gate driver ICs and the scan lines occupy much space in the lateral direction, which is undesired.

Figure 2:
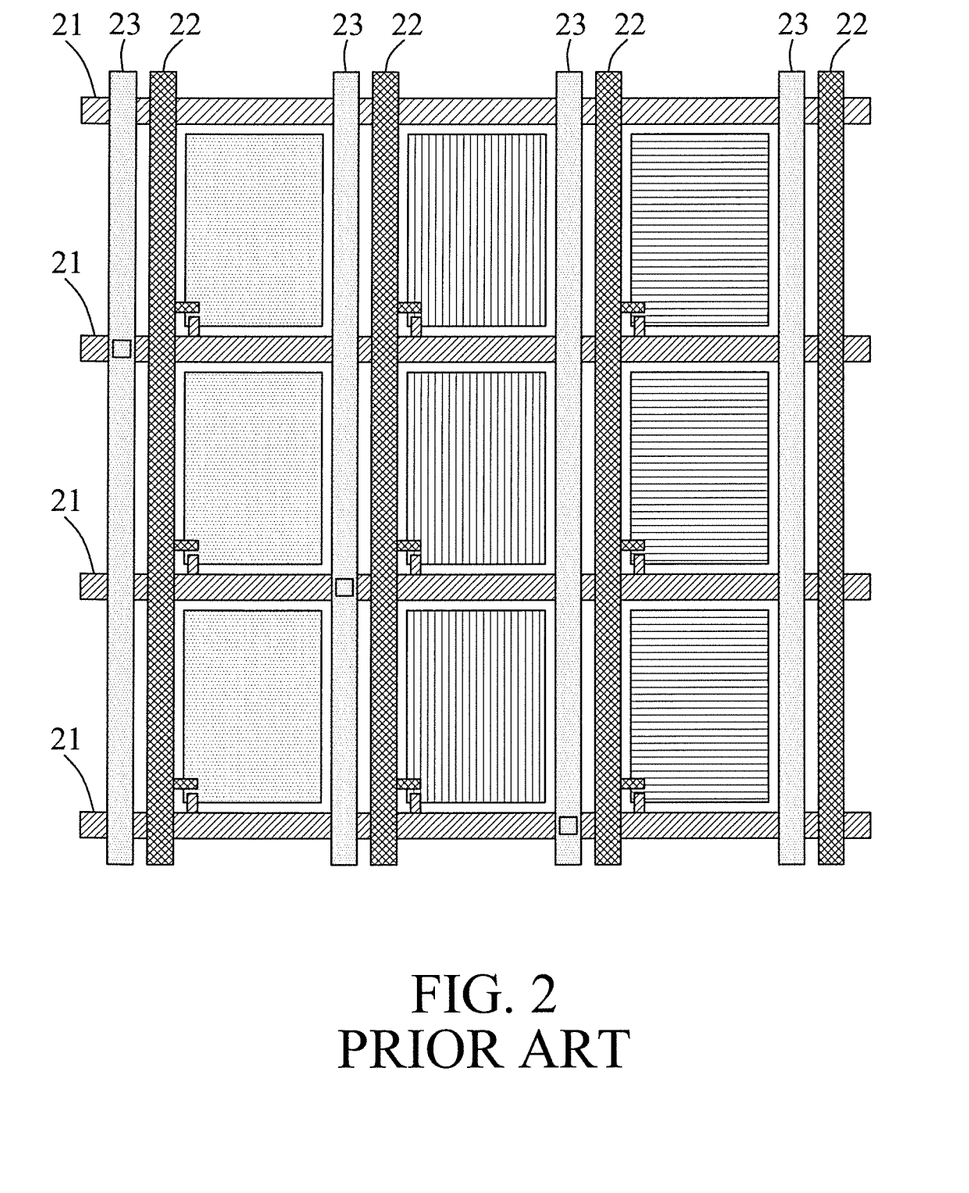
FIG. 2 is a plan view illustrating a conventional pixel structure for a display panel, where vertically-extending connection lines are used in a conventional 1G1D structure.

To solve this problem, a panel structure was proposed to use vertically-extending connection lines 23 in the 1G1D structure for connecting scan lines 21 to gate driver ICs in a vertical direction, as shown in FIG. 2. Although the size of the frame border of the display panel is reduced this way, the vertically-extending connection lines 23 that are arranged to be parallel to the data lines 22 in a horizontal direction contribute to reducing the aperture ratio of the pixels.

SUMMARY

Therefore, an object of the disclosure is to provide a display panel that applies the vertically-extending connection lines to the 1G2D structure.

According to the disclosure, the display panel includes multiple pairs of scan lines, multiple data lines, and multiple connection lines. The scan lines extend in a first direction. For each of the pairs, the scan lines are to be provided with a same electrical signal. The data lines extend in a second direction transverse to the first direction, and cooperate with the scan lines to define a plurality of pixel regions, wherein any two of the data lines are interposed between two of the pixel regions that are immediately adjacent to each other in the first direction in plan view. The connection lines extend in the second direction. Each of the connection lines is electrically connected to a corresponding one of the pairs of scan lines.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
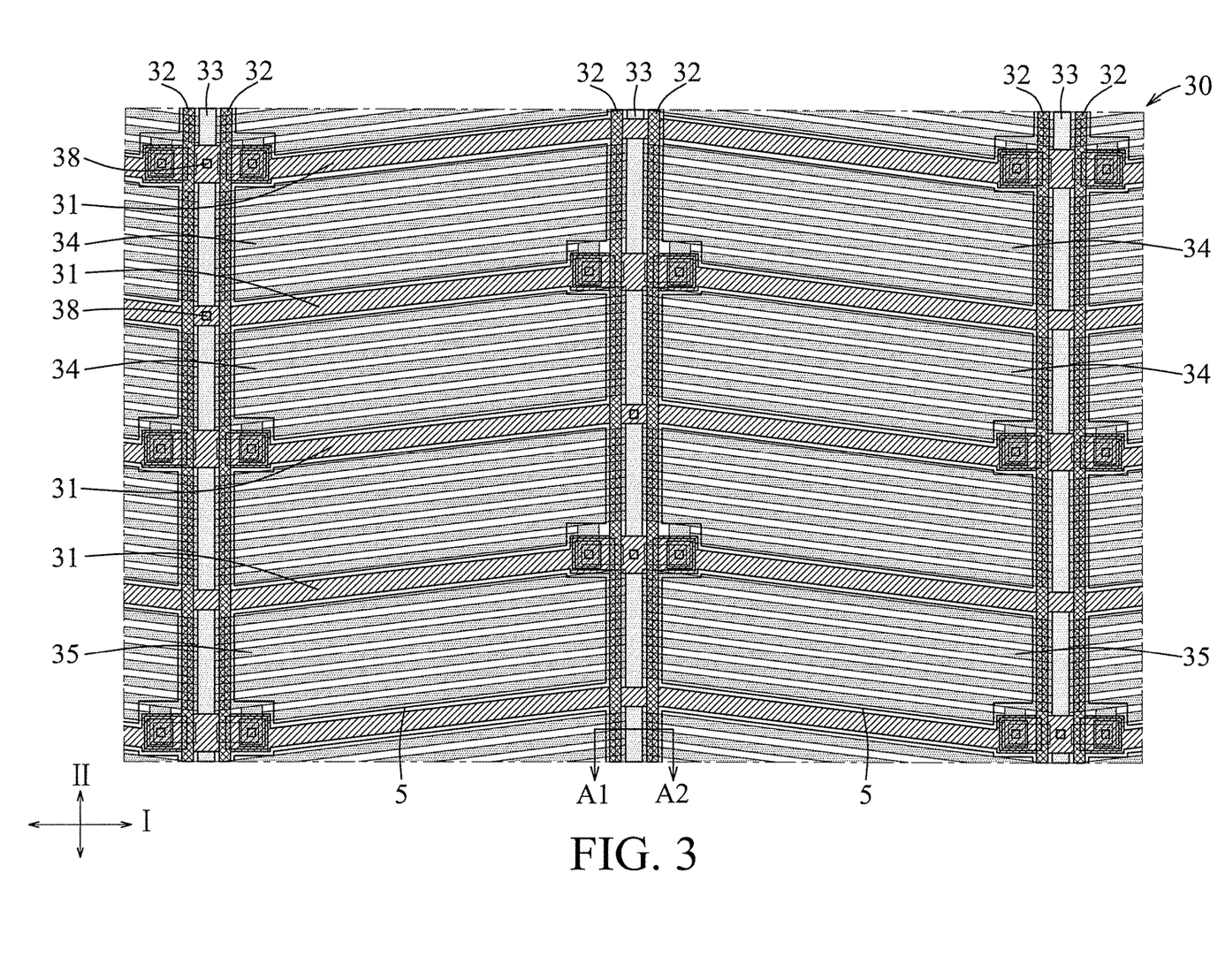
FIG. 3 is a plan view illustrating a first embodiment of a pixel structure for a display panel according to this disclosure.

FIG. 3 illustrates a plan view of a first embodiment of a pixel structure for a display panel 30 (e.g., an LCD panel, etc.) according to this disclosure. In this embodiment, the display panel 30 is exemplified as an LCD panel that uses a multi-domain design where pixel electrodes 35 of immediately adjacent columns of pixels extend in different directions, and includes a TFT substrate (not shown in FIG. 3) and a color filter substrate (not shown), each of which may be a glass substrate or a plastic substrate. The display panel 30 further includes multiple layers that are formed on the TFT substrate. The multiple layers include a layer in which multiple pairs of scan lines 31 are located or formed (referred to as a layer of scan lines hereinafter), a layer in which multiple data lines 32 are located or formed (referred to as a layer of data lines hereinafter), and a layer in which multiple connection lines 33 are located or formed (referred to as a layer of connection lines hereinafter). The scan lines 31 extend in a first direction (I), the data lines 32 extend in a second direction (II) transverse to the first direction (I), and the connection lines 33 extend in the second direction (II) and are located between the two of the data lines 32. Furthermore, the connection lines 33 extend in the second direction (II) and are located between the outermost two of the data lines 32. Two of the data lines includes a first data line and a second data line. The first data line has a first side and a second side opposite to the first side, extending in the second direction (II). The second data line has a third side and a fourth side opposite to the third side, extending in the second direction (II). The second side of the first data line faces the third side of the second data line. The connection line 33 is located between a first side of the first data line 32 and a fourth side of the second data line 32. Usually, the scan lines 31, the data lines 32 and the connection lines 33 are metal lines. The scan lines 31 cooperate with the data lines 32 to define a plurality of pixel regions 34 in such a way that, two of the data lines 32 are interposed between any two of the pixel regions 34 that are immediately adjacent to each other (i.e., there is no pixel region 34 in between these two data lines 32) in the first direction (I) in plan view, thereby forming a 1G2D structure. The scan lines 31 that are in a pair are provided with the same electrical signal by a gate driver IC (not shown) that is disposed at an upper side or a lower side of the display panel 30. Each of the connection lines 33 is electrically connected to a corresponding one of the pairs of scan lines 31 (i.e., a corresponding pair of the scan lines 31), so as to connect the two corresponding scan lines 31 to the gate driver IC. Particularly, each connection line 33 is electrically connected at two contact points 38 to the corresponding pair of scan lines 31. One of the two contact points 38 is a point where the connection line 33 crosses one of the two scan lines 31 in the corresponding pair, and the other of the two contact points 38 is a point where the connection line 33 crosses the other one of the two scan lines 31 in the corresponding pair. Each of the contact points 38 may be realized as a contact hole that extends through insulation layers between the layer of scan lines and the layer of connection lines. In this embodiment, for each connection line 33, the two scan lines 31 in the corresponding pair are electrically connected to each other via only the two contact points 38 and the connection line 33. In other embodiments, the scan lines 31 that are in a pair may be electrically connected to each other via a metal line that is located outside of an active area (also referred to as a display area) of the display panel 30, and there may be only one contact point formed to interconnect the two scan lines 31 and the corresponding connection line 33.

In this embodiment, the layer of connection lines, the layer of scan lines, and the layer of data lines are stacked in this order in a direction perpendicular to a screen surface of the display panel 30. This configuration can make the distance between the connection line and the data line greater to reduce capacitance formed between the data lines 32 and the connection lines 33. In other embodiments, the layer of scan lines, the layer of data lines and the layer of connection lines may be stacked in other orders as desired. Furthermore, the color filter substrate includes a black matrix. The black matrix overlaps the scan lines 31, data lines 32, the connection lines 33, and so on in plan view. Reference numeral 5 denotes an edge of a black matrix in plan view when the TFT substrate and the color filter substrate are bonded.

Figure 4:
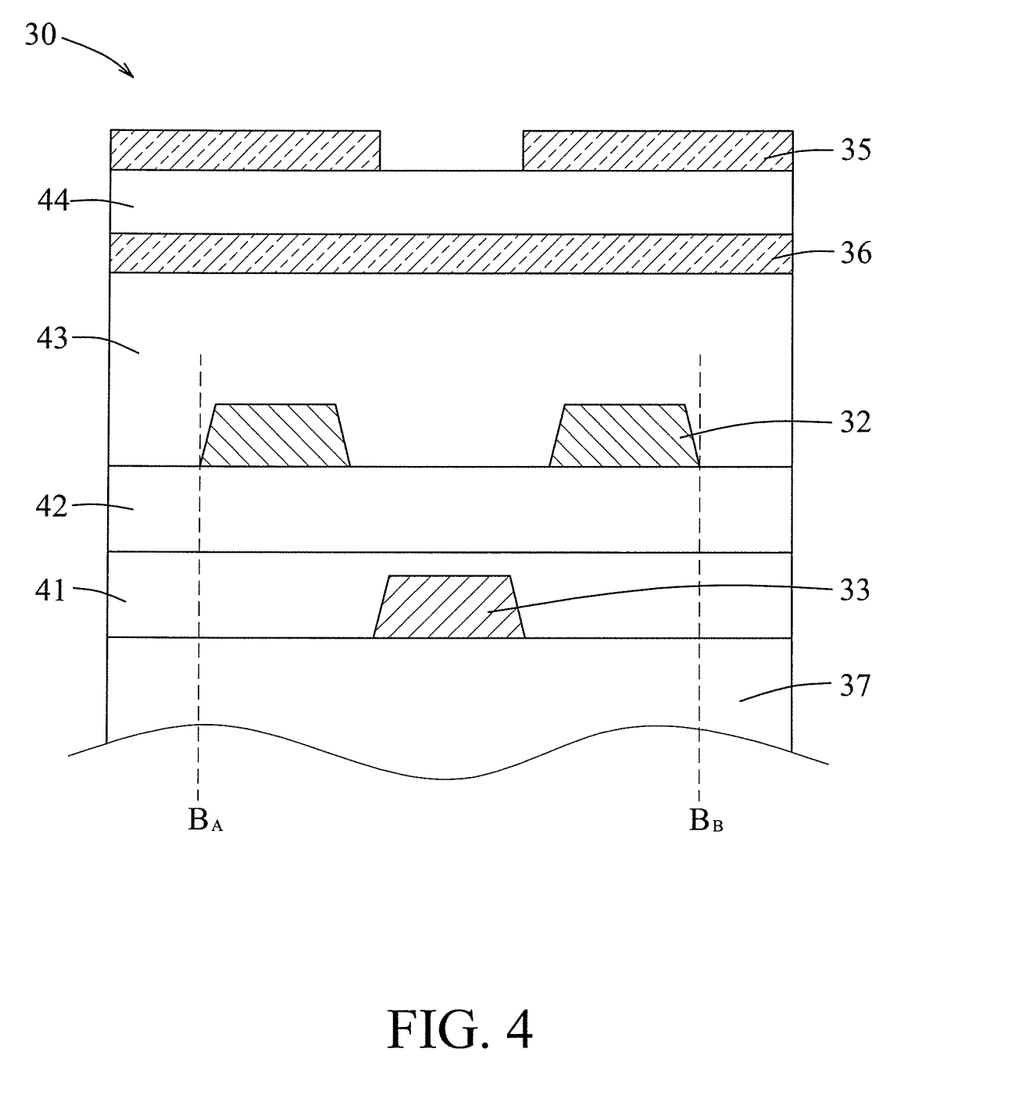
FIG. 4 is a sectional view illustrating a part of the first embodiment taken along line A1-A2 in FIG. 3.

FIG. 4 shows a sectional view of a part of the pixel structure taken along line A1-A2 in FIG. 3, having a common electrode 36 and the TFT substrate 37 of the display panel 30, and the multiple layers are located above the TFT substrate 37. An insulating layer 41 covers the connection lines 33. The insulating layer 41 is disposed between the layer of connection lines 33 and the layer of scan lines 31 (see FIG. 3, not shown in FIG. 4). An insulating layer 42 covers the scan lines 31. The insulating layer 42 is disposed between the layer of scan lines 31 and the layer of data lines 32. An insulating layer 43 covers the data lines 32. The insulating layer 43 is disposed between the layer of data lines 32 and the common electrode 36. An insulating layer 44 covers the common electrode 36. The insulating layer 44 is disposed between the common electrode 36 and the pixel electrodes 35.

In plan view (viewed from the top of FIG. 4 toward the bottom of FIG. 4), each connection line 33 is disposed between outer boundaries $B_A$, $B_B$ of two of the data lines 32 that are immediately adjacent to each other, so as to mitigate a reduction of the aperture ratio of pixels due to the use of the connection lines 33. Particularly, each connection line 33 is disposed between and spaced apart from the corresponding two data lines 32 in plan view. In other words, the connection line 33 does not overlap the corresponding two data lines 32 in plan view. This arrangement is advantageous in that signal delay on the data lines 32 stemming from capacitance due to an overlap between the data lines 32 and the connection lines 33 can be restrained. In one implementation, in order to further reduce the impact of the use of the connection lines 33 on the aperture ratio of pixels, each connection line 33 may overlap at least one of the corresponding two data lines 32 in plan view, thereby bringing the two immediately adjacent data lines 32 closer to each other.

Figure 5:
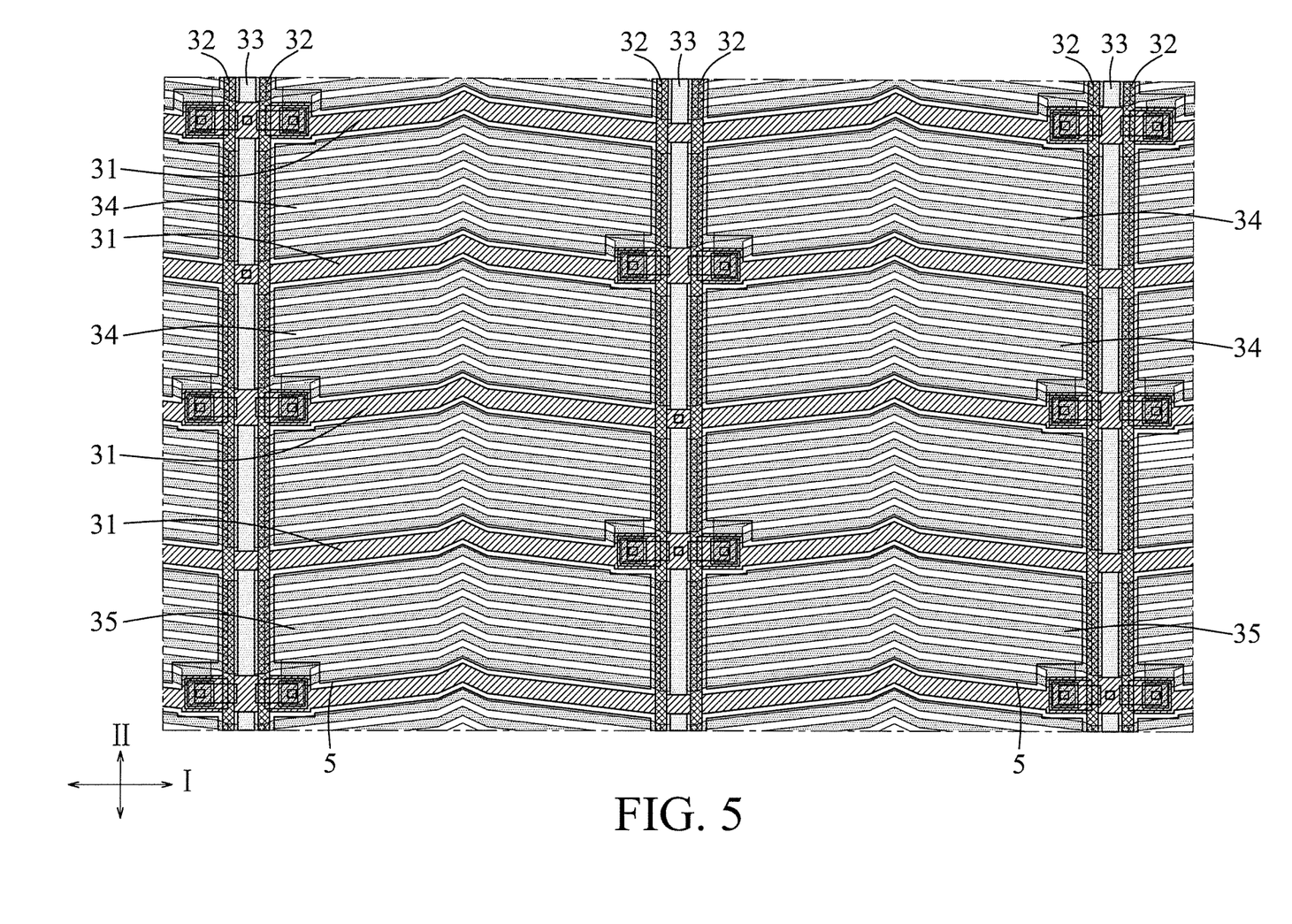
FIG. 5 is a plan view illustrating another implementation of the first embodiment.

FIG. 5 exemplarily shows another example that employs the first embodiment, and that employs an in-pixel multi-domain design where the pixel electrode 35 of each pixel is bent.

Figure 6:
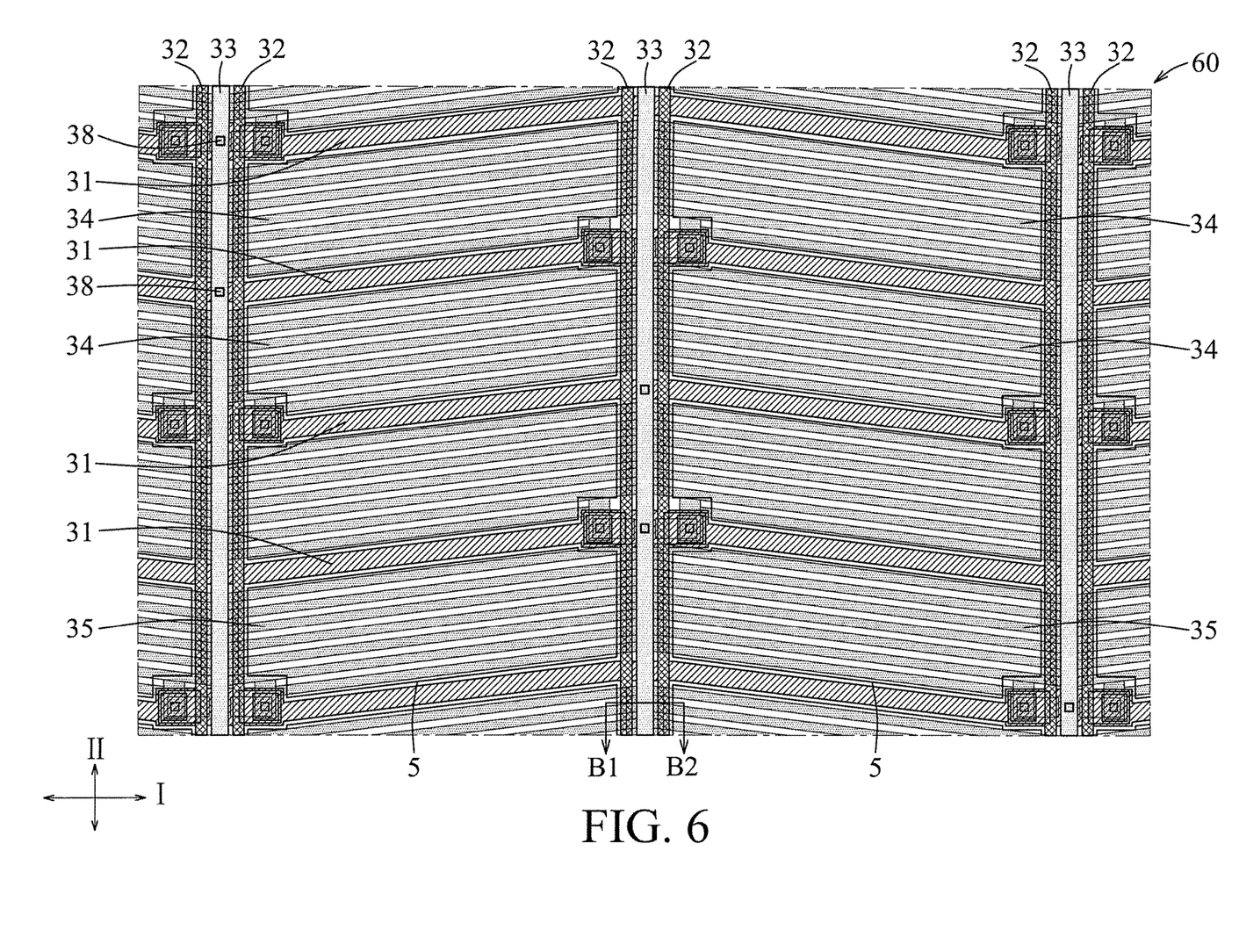
FIG. 6 is a plan view illustrating a second embodiment of a pixel structure for a display panel according to this disclosure.
Figure 7:
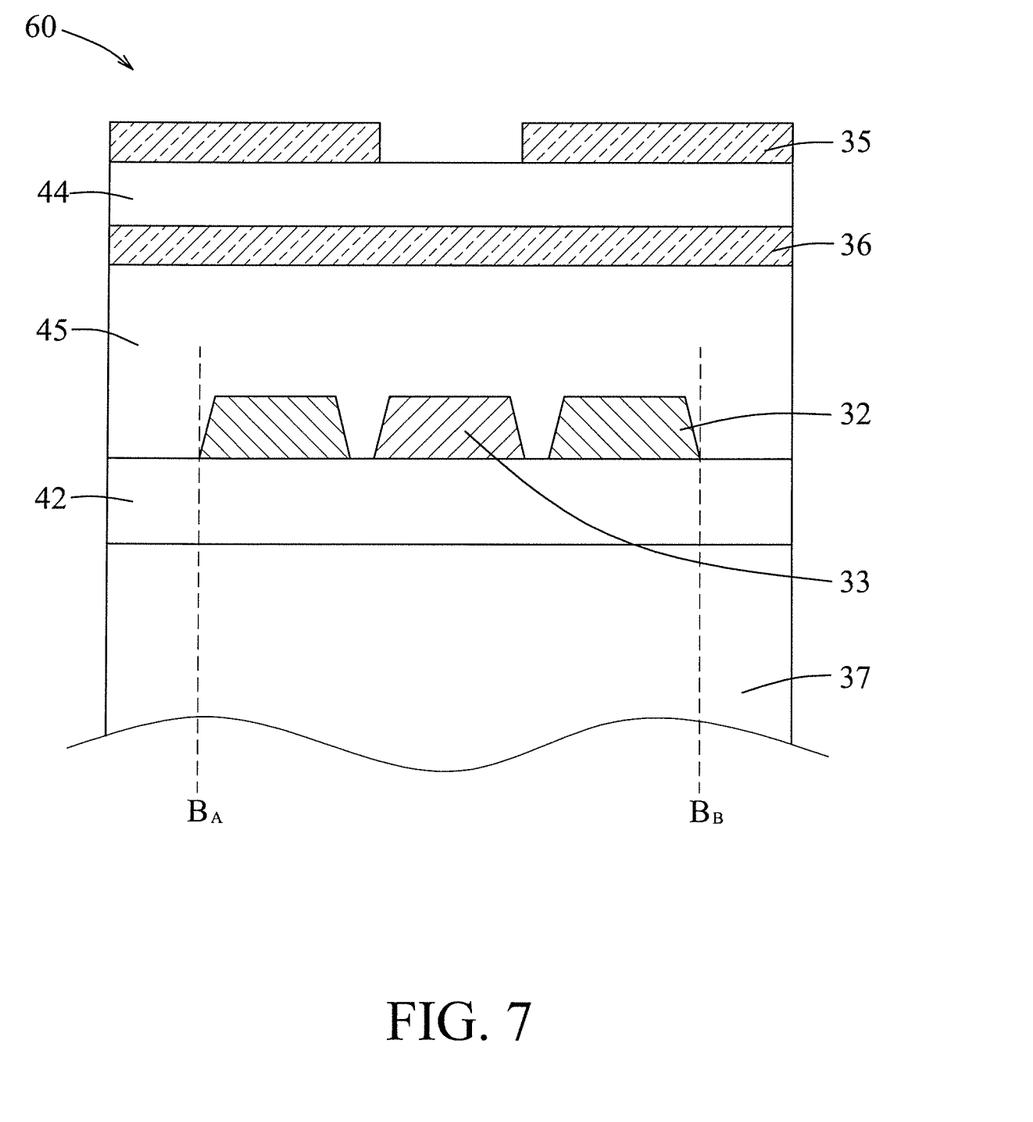
FIG. 7 is a sectional view illustrating a part of the second embodiment taken along line B1-B2 in FIG. 6.

FIG. 6 illustrates a plan view of a second embodiment of a pixel structure of a display panel 60 according to this disclosure. The second embodiment differs from the first embodiment in that the data lines 32 and the connection lines 33 are located in the same layer. In other words, the layer of connection lines and the layer of data lines are the same layer in the second embodiment. FIG. 7 shows a sectional view of a part of the pixel structure taken along line B1-B2 in FIG. 6. Since each connection line 33 is disposed between and spaced apart from the corresponding two of the data lines 32 that are immediately adjacent to each other, a corresponding part of a black matrix, which is used to cover the non-transparent portion of each pixel, will be wider, thereby facilitating placement of spacers between the TFT substrate and the color filter substrate of the display panel 60. An insulating layer 45 covers the data lines 32 and the connection lines 33. The insulating layer 45 is disposed between the layer of data lines 32 and connection lines 33 and the common electrode 36.

Figure 8:
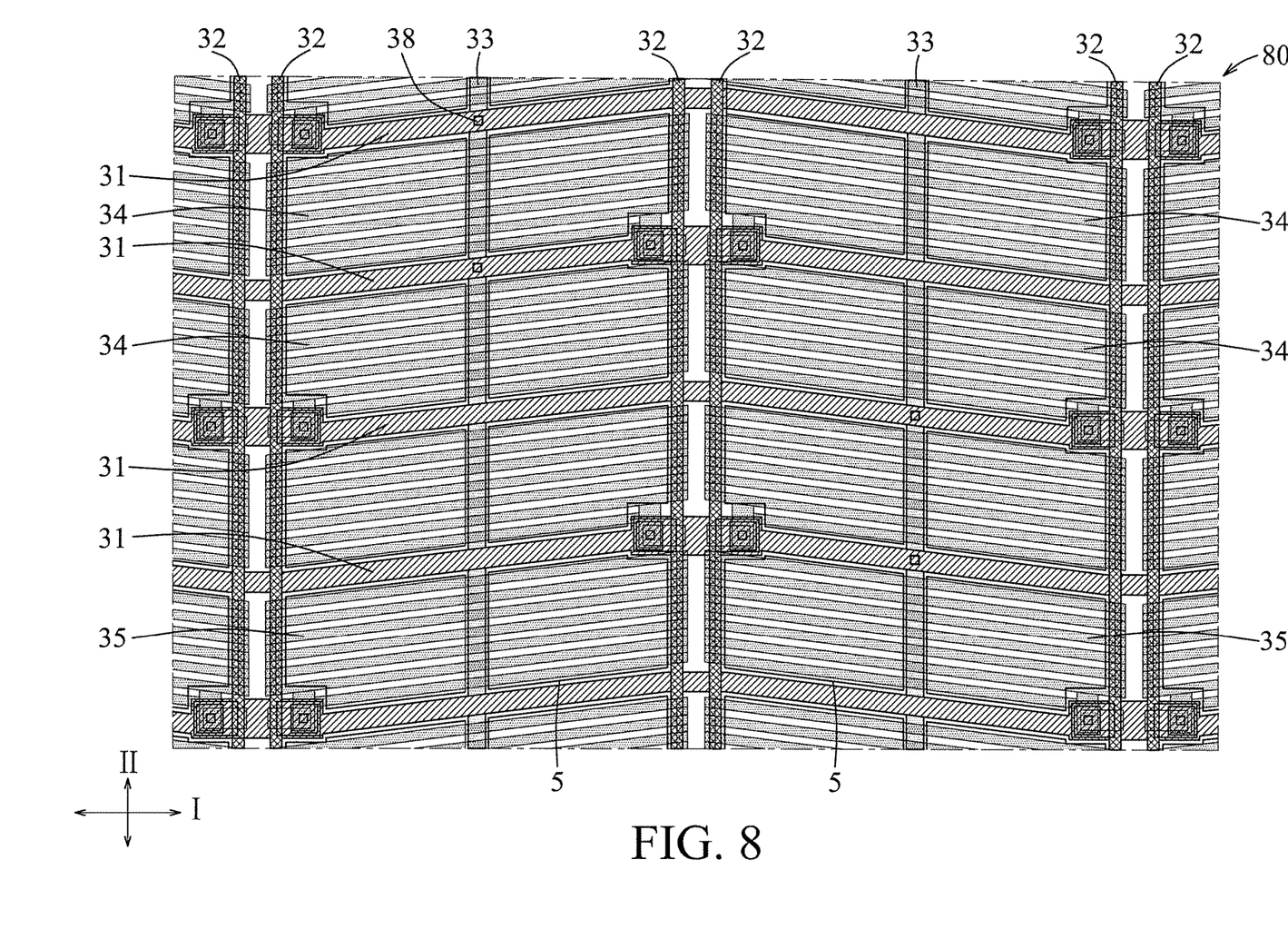
FIG. 8 is a plan view illustrating a third embodiment of a pixel structure for a display panel according to this disclosure.

FIG. 8 illustrates a plan view of a third embodiment of a pixel structure of a display panel 80 according to this disclosure. In this embodiment, each connection line 33 extends through and partly overlaps the pixel regions 34 of the pixels in the corresponding column. In this configuration, the data lines 32 and the connection lines 33 may be located either in the same layer or in different layers. In one implementation, the layer of connection lines is under the layer of scan lines. Compared to the third embodiment, the second embodiment is advantageous in that, when there is a deviation in alignment between the TFT substrate and the color filter substrate, the resultant reduction in aperture ratio would be smaller.

Figure 9:
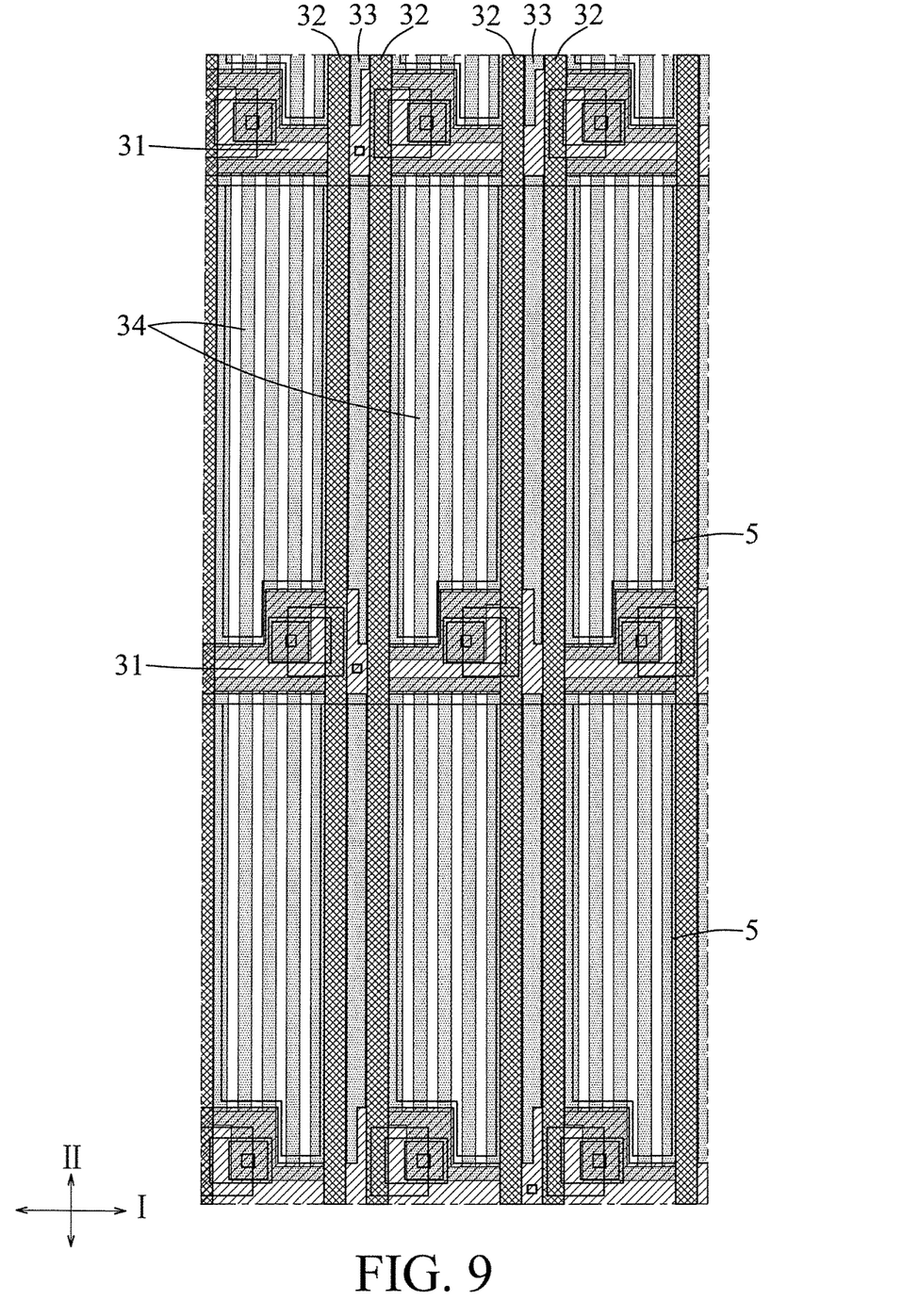
FIG. 9 is a plan view illustrating exemplarily another application of the embodiments.

In the aforesaid embodiments, the pixel regions 34, each corresponding to a sub-pixel, are configured to have a longer axis extending in the first direction (I), but this disclosure is not limited to such. The configuration disclosed in each of the first to third embodiments is also applicable to a case where the longer axis of the pixel regions 34 extends in the second direction (II), as exemplified in FIG. 9.

In summary, the embodiments of this disclosure provide a display panel that uses the 1G2D structure with the connection lines 33 extending in the same direction as the data lines 32 to connect the scan lines 31 to the gate driver ICs in the second direction (II), so as to reduce the frame size of the display panel in the first direction (I). In some embodiments, the connection lines 33 overlap the data lines 32 in plan view, so as to minimize the impact of the use of the connection lines 33 on the aperture ratio.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A display panel comprising:
   multiple pairs of scan lines that extend in a first direction, wherein, for each of the pairs, the scan lines are to be provided with the same electrical signal;
   a plurality of data lines that extend in a second direction transverse to the first direction, and that cooperate with said scan lines to define a plurality of pixel regions, wherein two of said data lines are interposed between two of said pixel regions that are immediately adjacent to each other in the first direction in a plan view; and
   a plurality of connection lines that extend in the second direction, wherein each of said connection lines is electrically connected to a corresponding pair of scan lines,
   wherein in the plan view, one of said connection lines is disposed between said two of said data lines,
   said one of said connection lines is electrically connected at two contact points to the corresponding pair of scan lines, a first contact point of said two contact points being located where said one of said connection lines crosses one of two scan lines in the corresponding pair of scan lines, and a second contact point of said two contact points being located where said one of said connection lines crosses the other one of said two scan lines in the corresponding pair of scan lines, and
   a first width of said one of said two scan lines in the second direction at said first contact point is smaller than a second width of said other one of said two scan lines in the second direction at said second contact point.

2. The display panel of claim 1, wherein, in the plan view, said one of said connection lines is disposed between outer boundaries of said two of said data lines.

3. The display panel of claim 1, comprising multiple layers, wherein said data lines are located in a first layer of said multiple layers, and said connection lines are located in a second layer of said multiple layers different from said first layer.

4. The display panel of claim 3, wherein, in the plan view, said one of said connection lines at least partially overlaps at least one of said two of said data lines.

5. The display panel of claim 3, wherein, in the plan view, said one of said connection lines is disposed between and spaced apart from said two of said data lines.

6. The display panel of claim 3, wherein said multiple layers have a layer of said connection lines, a layer of said scan lines, and a layer of said data lines, and said layer of said connection lines, said layer of said scan lines, and said layer of said data lines are stacked in this order in a direction perpendicular to a screen surface of said display panel.

7. The display panel of claim 2, further comprising multiple layers, wherein said data lines and said connection lines are located in the same one of said layers; and
   wherein, in the plan view, said one of said connection lines is disposed between said two of said data lines.

8. The display panel of claim 1, wherein said two scan lines in the corresponding pair of scan lines that corresponds to said one of said connection lines are electrically connected to each other via only said two contact points and said one of said connection lines.

9. The display panel of claim 1, wherein said connection lines are located between outermost two of said data lines.

10. The display panel of claim 1, wherein said two of said data lines includes a first data line and a second data line,
    the first data line has a first side and a second side opposite to the first side, the first side and the second side extending in the second direction,
    the second data line has a third side and a fourth side opposite to the third side, the third side and the fourth side extending in the second direction, the third side of the second data line facing the second side of the first data line,
    said one of said connection lines is located between the first side of the first data line and the fourth side of the second data line in the plan view.

11. The display panel of claim 1, further comprising:
    a first thin film transistor electrically connected to one of said two of said data lines and said one of said connection lines; and
    a second thin film transistor electrically connected to other one of said two of said data lines and said one of said connection lines;
    wherein said second contact point is disposed between said first thin film transistor and said second thin film transistor.

* * * * *